(12) United States Patent
Dang et al.

(10) Patent No.: US 8,285,778 B2
(45) Date of Patent: Oct. 9, 2012

(54) PROTECTING WEB APPLICATION DATA

(75) Inventors: Ya Bin Dang, Beijing (CN); Da Ming Hao, Beijing (CN); Peng Ji, Beijing (CN); Lin Luo, Beijing (CN); Yu Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 583 days.

(21) Appl. No.: 12/491,647

(22) Filed: Jun. 25, 2009

(65) Prior Publication Data

US 2009/0327411 A1    Dec. 31, 2009

(30) Foreign Application Priority Data

Jun. 27, 2008    (CN) .......................... 2008 1 0127537

(51) Int. Cl.
*G06F 15/16* (2006.01)
(52) U.S. Cl. ....................................................... 709/203
(58) Field of Classification Search .................. 709/201, 709/203, 217, 238
See application file for complete search history.

(56) References Cited

U.S. PATENT DOCUMENTS

| 2005/0188221 | A1 | 8/2005 | Motsinger |
| 2006/0294206 | A1* | 12/2006 | Graveline et al. ............. 709/219 |
| 2007/0083813 | A1* | 4/2007 | Lui et al. ....................... 715/709 |

* cited by examiner

*Primary Examiner* — Joseph Avellino
*Assistant Examiner* — Marshall McLeod
(74) *Attorney, Agent, or Firm* — Vazken Alexanian

(57) ABSTRACT

A method, system and an article of manufacture tangibly embodying a computer readable program for protecting Web application data between a server and a client. A response created by the Web application for the client is backed up and modified by adding capturing code for capturing a user action, user data of the client, or combination thereof. The modified response is sent to the client and a request submitted by the client and the user action and/or user data captured by the capturing code is received. A verifying request is generated according to the received user action/user data captured by the capturing code and the backup of the response. The request submitted by the client is verified according to the verifying request and the verified request is sent to the Web application of the server.

19 Claims, 4 Drawing Sheets

PROTECTING WEB APPLICATION DATA

CROSS-REFERENCE TO RELATED APPLICATION

This application claims priority under 35 U.S.C. §119(a) from Chinese Patent Application No. 200810127537.9 filed Jun. 27, 2008, the entire contents of which are incorporated herein by reference.

BACKGROUND OF THE INVENTION

1. Field of Invention

The present invention relates to the field of computer network security. In particular, the present invention relates to a method, system and an article of manufacture tangibly embodying a computer readable program for protecting Web applications from network attacks.

2. Description of the Related Art

With the advancements of computer and Internet technology, Web applications such as online shopping and Internet banking are becoming increasingly popular. However, attacks on Web applications have become a big threat in the past decade because even if a firewall has a strong set of rules and a server is duly patched all the time, an attacker may walk right into the system through port 80 when Web application developers do not follow secure coding practice. SQL (Structured Query Language) injection and XSS (Cross-site scripting) are two of the most popular types of attacks. Data in a database may be stolen by SQL injection, and even the whole database can be dumped, which may cause a disaster to some applications. Through XSS, secret data of a normal user (e.g. their user identity or session identity) may be stolen.

Some approaches against such attacks are currently available. One approach is to scan an application using some type of black-box testing tool (e.g. AppScan®) and fix the vulnerabilities manually. But this approach cannot always be effective because some applications are not easy to be redeployed quickly and in some cases source code cannot be obtained. Another approach is to use a WAF (Web Application Firewall) to filter malicious requests before a Web server. This method enables filtering rules to be updated at runtime so that an application does not need to be redeployed when a new vulnerability is found. However, this method also has some disadvantages. First, each input filed needs to be manually configured carefully, which may cost much effort. Second, a WAF cannot recognize some request fields because they may have been encoded with script before being submitted.

Besides SQL injection and XSS, another popular threat is tampering with hidden fields. Since junior developers may use hidden fields to keep user information without checking them on the server site, tampering with the hidden fields may break business logic. An approach to solve this problem is to sign these hidden fields before sending them to the client site. When a request containing these fields returns, the signature will be verified to ensure that these fields are not tampered with. However, some forms are hard to be defined statically because they are created at runtime by script in client browser. Furthermore some developers may keep these key user information not only in hidden fields, but also in any tag of an html document and get their value by script at runtime. Therefore, it is very difficult to define which response value should be signed.

In some extreme cases, part of business logic is performed by script on the client site, while verification is neglected on the server site (e.g., a total price may be calculated on the client site by multiplying a unit price with a total count, however the total price is not verified on the server site). Currently there is no good solution to handle this problem.

Another important security issue related to Web applications is unauthorized accessing. By observation, a hacker may guess a link embedded in a Web page, thus getting the access to unauthorized resources.

In general, because script is involved, it is difficult to get a thorough solution to solve these security issues without changing source code.

SUMMARY OF THE INVENTION

In one aspect, the present invention provides a method for protecting Web application data between a Web application of a server and a client. The method includes backing up a response created by the Web application for the client. The response is modified by a adding capturing code. The capturing code captures a user action, user data of the client, or a combination thereof. The modified response is sent to the client. A request submitted by the client and the user action, user data of the client, or combination thereof captured by the capturing code is received. A verifying request according to the received user action, user data of the client, or combination thereof captured by the capturing code and the backup of the response is generated. The request submitted by the client according to the verifying request is verified. The request submitted by the client to the Web application of the server is then verified.

According to another aspect of the present invention, a system is provided for protecting Web application data between a Web application of a server and a client. The system includes a backing-up device configured to back up a response created by the Web application. A modification device is configured to modify the response by adding capturing code. The capturing code captures a user action, user data of the client, or combination thereof. A sending device is configured to send the modified response to the client. A receiving device is configured to receive a request submitted by the client and the user action, user data of the client, or combination thereof captured by the capturing code. A generation device is configured to generate a verifying request according to the user action, user data of the client, or combination thereof captured by the capturing code and the backup of the response. A verification device is configured to verify the request submitted by the client according to the verifying request. The sending device is further configured to send the verified request submitted by the client to the Web application of the server.

Another aspect of the invention provides an article of manufacture tangibly embodying a computer readable program containing executable program instructions which when executed, implements the steps of the above method according.

BRIEF DESCRIPTION OF THE DRAWINGS

The present invention will be easily understood by reference to the following description of the preferred embodiments when read in conjunction with the accompanying drawings in which same or corresponding reference numerals refer to same or corresponding characteristics or components.

DESCRIPTION OF THE PREFERRED EMBODIMENTS

The present invention provides a novel method, system and computer readable medium for protecting Web application data between a server and a client, so as to solve at least one of the security issues related to network attacks in the prior art.

Aspects of the present invention for protecting Web application data between a server and a client recognize that at least one of the following problems in the prior art can be solved.

First, many SQL injection and XSS vulnerabilities lie in neglecting of corresponding server site verification while a user input is verified normally on the client site. In the present invention, original data is re-verified so that a hacker cannot bypass script verification. Furthermore, verification will not be disturbed by encoding because the verification is performed on the original data.

Second, in the case that the response contains a hidden field storing user information, even if a hacker tampers with a hidden field, a discord indicating the tampering will arise while verification is done according to the present invention because a backup is kept.

Third, business logic can be re-performed in the present invention; therefore verification according to the present invention may prevent hacking.

Finally, it can be checked whether or not the request URL already exists in the backup of the response document. If the request URL does not exist, it means that the client is trying to get an unauthorized access.

Compared with technical solutions in the prior art, embodiments of the present invention recognize at least one of the following advantages can be achieved:
 (1) providing a thorough solution to a variety of network attack threats;
 (2) manual configuration is not needed in most cases, therefore much effort is saved;
 (3) source code of a Web application need not to be modified, so that the service need not be redeployed; or
 (4) providing a solution to prevent client business logic tampering, which other solutions cannot handle.
Embodiments of the present invention further recognize that developers do not need to write server site input verification code, server site authorization code, etc., which may shorten the software lifecycle.

Embodiments of the present invention will be described hereinafter with reference to the accompanying drawings. It should be noted that representations and descriptions of components and processes irrelevant to the present invention or known to a person having ordinary skill in the art are omitted for clarity.

Figure 1:
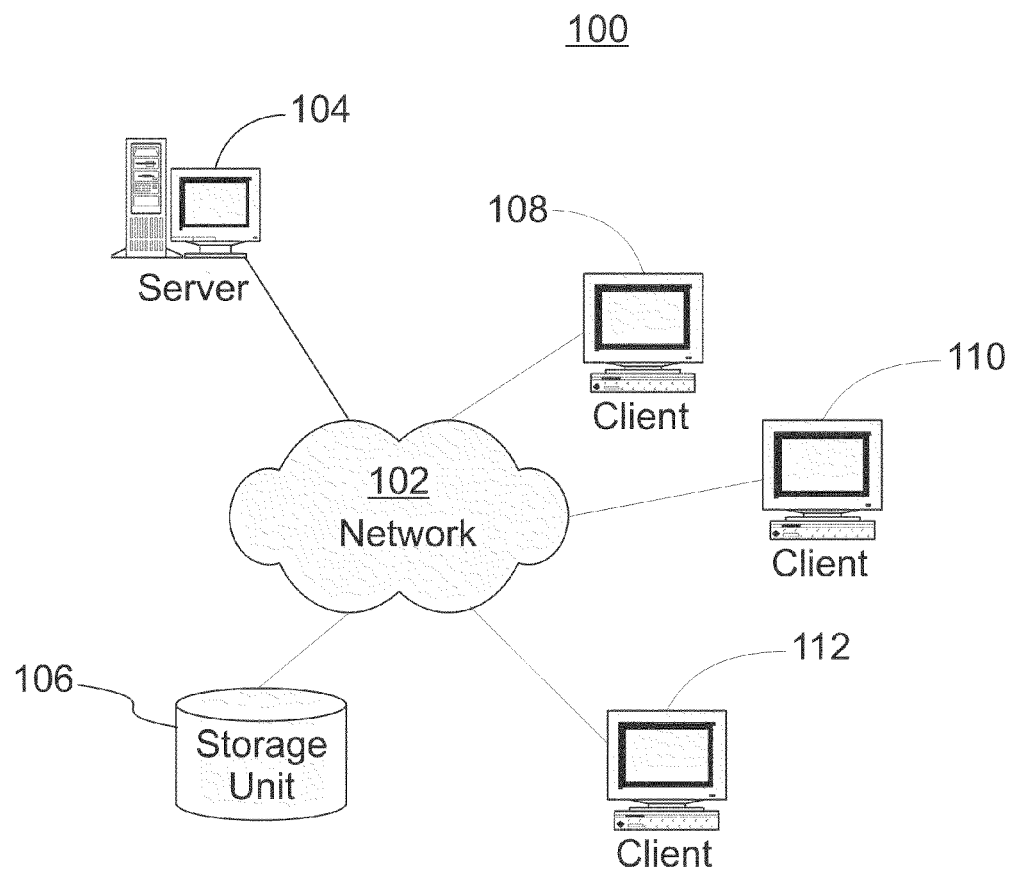
FIG. 1 is a block diagram of a distributed data processing system in which the present invention can be implemented.

With reference now to the figures, in particular with reference to FIG. 1, a block diagram of a distributed data processing system in which the present invention can be implemented is depicted. A distributed data processing system 100 is a computer network in which the present invention can be implemented. The distributed data processing system 100 contains a network 102, which is the medium used for providing communication links between various devices and computers connected together within the distributed data processing system 100.

In the depicted example, a server 104 is connected to the network 102 along with a storage unit 106. In addition, clients 108, 110, and 112 such as a work station, a personal PC, a mobile phone or PDA also are connected to the network 102. In the depicted example, the server 104 provides data, such as boot files, operating system images, and applications to the clients 108, 110, and 112. The distributed data processing system 100 can include additional servers, clients, and other devices not shown. In the depicted example, the distributed data processing system 100 is the Internet, and the network 102 represents a collection of networks and gateways that use the TCP/IP protocol suite to communicate with one another. Of course, the distributed data processing system 100 can also be implemented as a number of different types of networks.

FIG. 1 is intended as an example, and not as an architectural limitation of the present invention. Many modifications to the system shown in FIG. 1 can be made without departing from the spirit and scope of the present invention.

The present invention can be implemented as the data processing system of the sever 104, which can be a symmetric multiprocessor (SMP) system including a plurality of processors connected to a system bus. Alternatively, a single processor system can be employed. The present invention may also be implemented as the data processing system of the client computers in FIG. 1.

Figure 2:
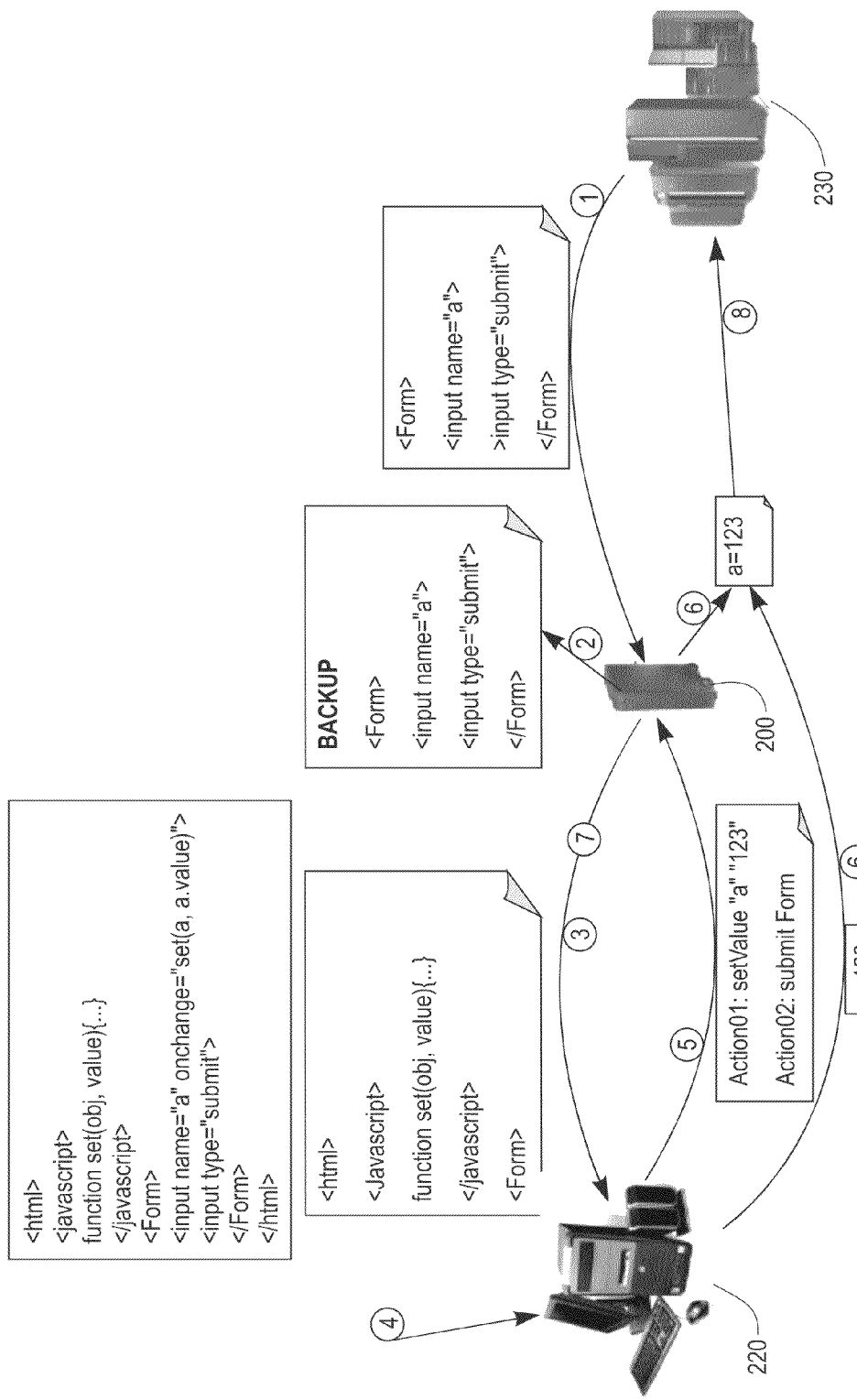
FIG. 2 is a diagram of a system in which a preferred embodiment of the present invention is implemented.
Figure 3:
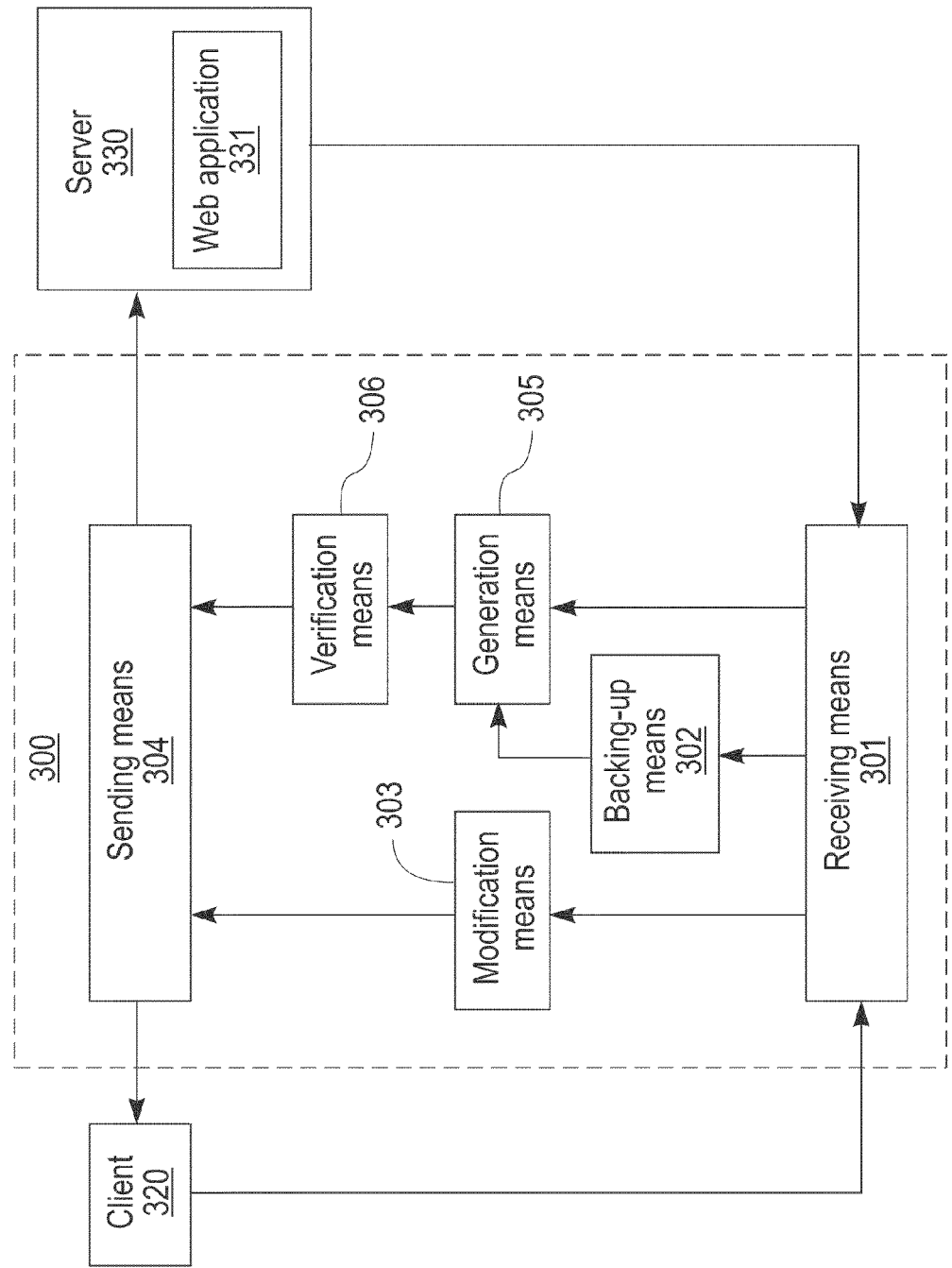
FIG. 3 is a system block diagram of a preferred embodiment of the present invention.

Embodiments of the present invention will be described hereinafter with reference to FIG. 2 and FIG. 3. FIG. 2 is a diagram of a system in which a preferred embodiment of the present invention is implemented; FIG. 3 is a system block diagram of a preferred embodiment of the present invention.

While a user opens a Web page, or inputs a file request by inputting a URL, or clicks a hypertext link through a browser, the browser builds up a HTTP request. As a client 220 of a Web application, a Web browser normally initiates a request by establishing a TCP/IP connection with a particular port of a remote computer. An HTTP server 230 monitoring the port waits for the client to send a request string. Once a request string (and possible information) is received, the server may complete the protocol by returning a response string.

Shown as reference numeral 1 of FIG. 2, the Web application of server 230 sends a response to the browser of the client 220 after creating the response. The response can be, for example, a response document based on an html Web page. In the preferred embodiment, the response document of the html Web page contains request information such as input name and input type (<input name="a">, <input type="submit">). It should be understood to those skilled in that art, the response can also be other types of responses that support the Web application.

As shown in FIG. 2, the response may first pass through a system 200 for protecting Web application data between the server and the client. According to the preferred embodiment, the system 200 of the present invention is located between the server 230 and the client 220, e.g., as a proxy server in front of the server. Alternatively, the system of the present invention can be deployed at the server 230, e.g., as a plug-in embedded in the server 230 (e.g. a plug-in of a WAS server or an Apache server).

Shown as reference numeral 2 of FIG. 2, the protection system backs up the response document.

The system is shown in details as FIG. 3. A response document created by a Web application 331 in a server 330 is received by a receiving means 301 of the protection system 300, and backed up by a backing-up means 302. Before backing up, optionally, the response document is parsed into a DOM tree containing a text object e.g. a normal html object and a script object (a JavaScript® object in the preferred embodiment) using a parsing means such as an html parser. The text object and the script object are sent to the backing-up means to be backed up, for example, to be stored by a DOM storage as the backing-up means. Alternatively, parsing can be done by the parsing means after the backing-up means 302 and before running the script on the original backup of the response (i.e. before a generation means 305). Therefore, the parsing means can be configured alternatively to parse the backup of the response so as to obtain a text object and a script object and send the text object and the script object to the generation means.

In addition, the original response document will be further modified by a modification means 303 (preferably an html processor). The modified response document is sent by a sending means 304 to the client 320, as shown in FIG. 3. The modification is described in details as below.

Reference numeral 3 of FIG. 2 shows a modified response document added with JavaScript® code/function. Particularly, some action (e.g. "onchange", "onsubmit") for capturing a user action and original data is added in an input tag of the original response document, and the user actions and original data can be captured using script code/function (JavaScript® function in the preferred embodiment) as the capturing code. In addition or instead, the script code/function can be used to mange an action list and determine when to send an action queue and related data to the system of the present invention. Thus the capturing code may send user actions and data of the client according to a captured particular user action.

Shown as reference numeral 4 of FIG. 2, when a user of the client takes an action, e.g., filling value "123" in an input box "a" or pressing a submit button, corresponding action information will be captured by an embedded "onchange"/"onsubmit" method and pushed into the action queue. When a key action (e.g. user presses a submit button) is captured, current action queue and corresponding original data (shown as reference numeral 5 of FIG. 2, Action01: setValue "a" "123"; Action02: submit Form) will be separately sent to the system of the present invention.

When the action queue and the original data are received by the system of the present invention, the system performs the captured actions chronologically on a JavaScript® engine using the backup of the response document and the received original data. For example, a captured "setValue" action sets the value of a corresponding input tag of the backup of the document to be the received original data. Finally, the system of the present invention generates a verifying request (a self-request form in the preferred embodiment).

Shown as reference numeral 7 of FIG. 2, the user request (i.e. form "a=123") is submitted by the browser. If the user of the client did not hack the data (e.g., submit a fake form), the verifying request (i.e., self-request form) generated in the system of the present invention should be identical to the form submitted by the client, shown as reference numeral 6 of FIG. 2. If the form is not hacked, it is submitted to the server, shown as reference numeral 8 of FIG. 2. The forms being not identical means that the submitted form is hacked (e.g., user breaks a verification function performed by JavaScript®).

Components that perform the steps shown as reference numeral 5-8 of FIG. 2 are illustrated in FIG. 3.

The receiving means 301 receives the request submitted by the client and the user action and data captured by the capturing code in the modified response simultaneously or sequentially; the generation means 305 performs the received user action captured by the capturing code on the backup of the response from the backing-up means 302 and the received user data captured by the capturing code, and generates a verifying request; the verification means 306 verifies the request submitted by the client according to the verifying request; the verified request submitted by the client is sent by the sending means 304 to the Web application of the server.

Both the generation means 305 and verification means 306 can be implemented by a script engine. For example, when the capturing code is written in JavaScript®, the generation means and verification means can be implemented by a JavaScript® engine. The verification means 306 can further include a verification result processor configured to, in response to the request submitted by the client failing to pass the verification, reject the request of the client and send a warning message to the client; or ignore the request submitted by the client and send the verifying request to the Web application; or send the request submitted by the client to the Web application while logging a warning message.

In the above embodiments, the capturing code is used to capture user actions and data of the client, e.g. may used to prevent business logic from being tampered with by tampering with a script file, to prevent server status data from being tampered with by tampering (adding, removing or modifying) with a hidden field or manipulating cookies, and/or to prevent an effective function from being input by bypassing the client. However it should be understood that to verify a user input action to avoid tampering with a selecting box, the added capturing code is used to capture user actions of the client and the generation means 305 is configured to perform the user actions captured by the capturing code on the backup of the response, and generate the verifying request for verifying the request submitted by the client.

However, when only the validity of a user input is to be verified, the added capturing code is used to capture use data of the client, the receiving means 301 is configured to receive the request submitted by the client and the user data captured by the capturing code and submitted together with the request submitted by the client. That is, in this case the capturing code may not be used to capture user actions; therefore the user data captured by the capturing code will be sent together with, not independently of, the request submitted by the client.

Figure 4:
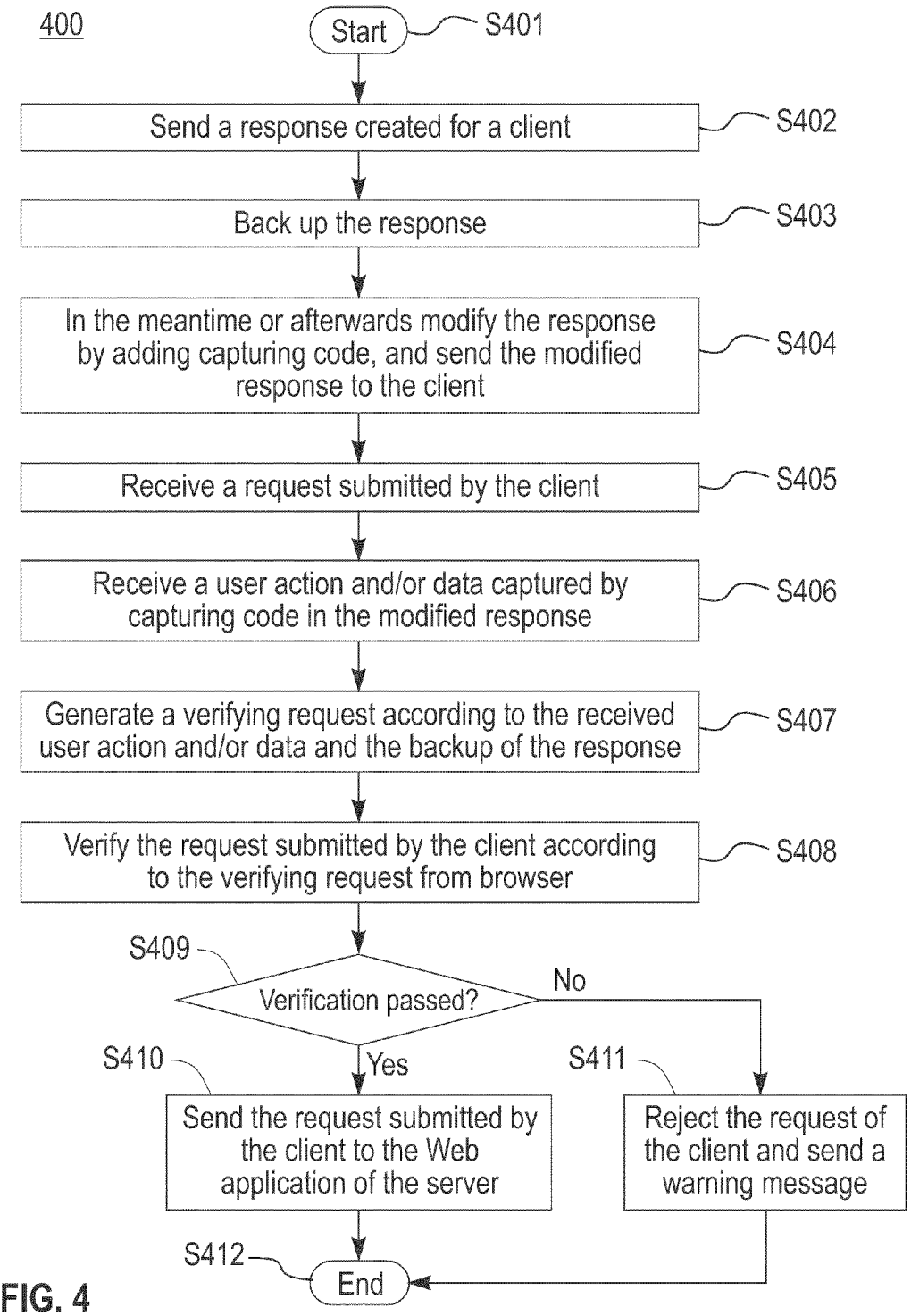
FIG. 4 shows a flow chart of a preferred embodiment of the present invention.

FIG. 4 shows a flow chart 400 for protecting Web application data between a server and a client according to a preferred embodiment of the present invention.

After starting at step S401, a response is sent created by the Web application for the client (S402). The response is backed up at (S403). The response is modified by adding capturing code for capturing a user action and/or user data of the client in the meantime or afterwards, and then sent to the client (S404).

After a user of the client fills in an input box and, for example, presses a submit button, the request submitted by the client is received (S405). The user action and/or user data captured by the capturing code in the modified response is received, either simultaneously or sequentially (S406). A verifying request is generated according to the received user action and/or user data captured by the capturing code and the backup of the response (S407). The request submitted by the client is then verified according to the verifying request (S408).

If the request submitted by the client passes the verification ("YES" at S409), the submitted request is sent to the Web application (S410), and the process ends (S412). If the request submitted by the client fails to pass the verification ("NO" at S409), the submitted request is rejected and a warning message is sent such as indicating that the request has been tampered with (S411), and the process ends (S412).

It should be understood that, to those skilled in the art, each or any step or part of the method and means according to the present invention can be implemented in any computer device (including processor, storage medium, etc.) or a network of computer devices, by hardware, firmware, software or a combination of them. This can be done by those skilled in the art with their basic programming abilities after reading the description of the present invention, thus a detailed description is omitted here.

Therefore, based on the above understanding, the present invention can be achieved for example, by running a program or a group of programs on any information processing device. The information processing device can be a known general purpose computer. Consequently, the present invention can also be achieved by providing an article of manufacture tangibly embodying a computer readable program containing program code that implements the method or the device. The storage medium can be any known storage medium Therefore it is not necessary to list a variety of storage media item-by-item.

According to the present invention, each element or step can be decomposed and/or re-combined. Such decomposition and/or re-combination should be seen as an equivalent solution. Furthermore, the steps performing the above series of processes can, but not necessarily, be performed chronologically in the natural order of the description. Some steps can be performed in parallel or independently of one another.

Exemplary embodiments of the present invention are described above. It should be understood by those skilled in the art that the protection scope of the present invention is not limited to the details disclosed herein, but may include various alternations and equivalents within the actual scope of the spirit of the present invention.

We claim:

1. A method for protecting Web application data between a Web application of a server and a client, the method comprising:
    backing up a response created by the Web application for the client;
    modifying the response by adding capturing code for capturing a user action, user data of the client, or a combination thereof;
    sending the modified response to the client;
    receiving a request submitted by the client and the user action, user data of the client, or combination thereof captured by the capturing code;
    generating a verifying request according to the received user action, user data of the client, or combination thereof captured by the capturing code and the backup of the response;
    verifying the request submitted by the client according to the verifying request; and
    sending the verified request submitted by the client to the Web application of the server.

2. The method according to claim 1, wherein the verifying request is generated by performing the received user action captured by the capturing code on the backup of the response.

3. The method according to claim 1, wherein the verifying request is generated by performing the received user action captured by the capturing code on the backup of the response and the received user data captured by the capturing code.

4. The method according to claim 1, wherein the capturing code also sends the user action, user data of the client, or combination thereof according to a captured particular user action; and
    wherein receiving the request submitted by the client and the user action, user data of the client, or combination thereof captured by the capturing code further comprises:
        receiving the request submitted by the client and the user action, user data of the client, or combination thereof of the client sent according to the captured particular user action.

5. The method according to claim 1, wherein receiving a request submitted by the client and a user action, user data of the client, or combination thereof captured by the capturing code further comprises:
    receiving the request submitted by the client and user data captured by the capturing code and submitted together with the request submitted by the client.

6. The method according to claim 1, wherein backing up the response created by the Web application for the client further comprises:
    parsing the response to obtain a text object and a script object, and backing up the text object and the script object.

7. The method according to claim 6, wherein the verifying request is generated according to the user action, user data of the client, or combination thereof captured by the capturing code and the text object and script object.

8. The method according to claim 1, wherein the request submitted by the client is verified by comparing the verifying request and the request submitted by the client.

9. The method according to claim 1, further comprising in response to the request submitted by the client failing to pass the verification, performing an action selected from the group consisting of:
    rejecting the request of the client and sending a warning message to the client;
    ignoring the request submitted by the client and sending the verifying request to the Web application; or
    sending the request submitted by the client to the Web application while logging a warning message.

10. A system for protecting Web application data between a Web application of a server and a client, the system comprising:
    a backing-up device, configured to back up a response created by the Web application;
    a modification device, configured to modify the response by adding capturing code wherein the capturing code is for capturing a user action, user data of the client, or combination thereof;
    a sending device, configured to send the modified response to the client;
    a receiving device, configured to receive a request submitted by the client and the user action, user data of the client, or combination thereof captured by the capturing code;
    a generation device, configured to generate a verifying request according to the user action, user data of the client, or combination thereof captured by the capturing code and the backup of the response; and
    a verification device, configured to verify the request submitted by the client according to the verifying request;
    wherein the sending device is further configured to send the verified request submitted by the client to the Web application of the server.

11. The system according to claim 10, wherein the generation device is further configured to generate the verifying request by performing the received user action captured by the capturing code on the backup of the response.

12. The system according to claim 10, wherein the generation device is further configured to generate the verifying request by performing the received user action captured by the capturing code on the backup of the response and the received user data captured by the capturing code.

13. The system according to claim 10, wherein the capturing code also sends the user action, user data of the client, or a combination thereof according to a captured particular user action; and wherein the receiving device is further configured to receive the request submitted by the client and the user action, user data of the client, or combination thereof sent according to the captured particular user action.

14. The system according to claim 10, wherein the receiving device is further configured to receive the request submitted by the client and the user data captured by the capturing code and submitted together with the request submitted by the client.

15. The system according to claim 10, further comprising a parsing device configured to parse the response to obtain a text object and a script object, and send the text object and the script object to the backing-up device.

16. The system according to claim 11, further comprising a parsing device configured to parse the backup of the response, and send a text object and a script object obtained from parsing the backup of the response to the generation device.

17. The system according to claim 10, wherein the verification device further comprises a verification result processor configured, in response to the request submitted by the client failing to pass the verification, to:
   reject the request of the client and send a warning message to the client;
   ignore the request submitted by the client and send the verifying request to the Web application; or
   send the request submitted by the client to the Web application while log a warning message.

18. A non-transitory article of manufacture tangibly embodying a computer readable program containing executable program instructions which when executed, implements the steps of a method for protecting Web application data between a Web application of a server and a client, the method comprising:
   backing up a response created by the Web application for the client;
   modifying the response by adding capturing code for capturing a user action, user data of the client, or a combination thereof;
   sending the modified response to the client;
   receiving a request submitted by the client and the user action, user data of the client, or combination thereof captured by the capturing code;
   generating a verifying request according to the received user action, user data of the client, or combination thereof captured by the capturing code and the backup of the response;
   verifying the request submitted by the client according to the verifying request; and
   sending the verified request submitted by the client to the Web application of the server.

19. The system according to claim 10, wherein the verification device is configured to compare the verifying request and the request submitted by the client.

* * * * *